(12) United States Patent
Raghavan et al.

(10) Patent No.: US 11,683,757 B2
(45) Date of Patent: Jun. 20, 2023

(54) LEVERAGING WAKE-UP SIGNALS AND DISCONTINUOUS RECEPTION CYCLES FOR ASSISTED ANTENNA CALIBRATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/302,737

(22) Filed: May 11, 2021

(65) Prior Publication Data
US 2021/0400582 A1    Dec. 23, 2021

Related U.S. Application Data

(60) Provisional application No. 63/042,179, filed on Jun. 22, 2020.

(51) Int. Cl.
| | |
|---|---|
| *H04W 52/02* | (2009.01) |
| *H04B 17/12* | (2015.01) |
| *H04W 76/28* | (2018.01) |
| *H04W 24/10* | (2009.01) |

(52) U.S. Cl.
CPC ........ *H04W 52/0229* (2013.01); *H04B 17/12* (2015.01); *H04W 24/10* (2013.01); *H04W 76/28* (2018.02)

(58) Field of Classification Search
CPC ....... H04B 17/12; Y02D 30/70; H04W 24/10; H04W 52/0219; H04W 52/0229; H04W 52/244; H04W 76/28; H04W 52/0216; H04W 52/0235; H04W 52/028; H04W 52/0232; H04W 52/0245; H04W 68/02; H04W 72/042; H04W 4/70; H04W 4/80; H04W 48/14
See application file for complete search history.

(56) References Cited

U.S. PATENT DOCUMENTS

| | | | |
|---|---|---|---|
| 8,401,485 B2* | 3/2013 | Jongren | H04B 17/24 455/67.11 |
| 11,140,630 B2* | 10/2021 | Lopez | H04W 52/0235 |
| 2007/0224943 A1* | 9/2007 | Gu | H04L 25/0242 455/562.1 |
| 2008/0219368 A1* | 9/2008 | Watanabe | H04W 24/02 375/260 |
| 2010/0150013 A1* | 6/2010 | Hara | H04B 17/12 370/252 |

(Continued)

*Primary Examiner* — Dung B Huynh
(74) *Attorney, Agent, or Firm* — Harrity & Harrity, LLP

(57) ABSTRACT

Various aspects of the present disclosure generally relate to wireless communication. In some aspects, a user equipment may monitor a wake-up signal (WUS) occasion based at least in part on a discontinuous reception cycle activation duration timer; and receive a reference signal (RS) during the WUS occasion, wherein the RS is to facilitate a UE-assisted calibration of at least one antenna element on at least one panel associated with a base station or a base station-assisted calibration of at least one antenna element on at least one panel associated with the UE. Numerous other aspects are provided.

30 Claims, 6 Drawing Sheets

(56) References Cited

U.S. PATENT DOCUMENTS

| | | | |
|---|---|---|---|
| 2011/0090063 A1* | 4/2011 | Koons | G06K 7/10009 340/10.33 |
| 2012/0038522 A1* | 2/2012 | Miyata | G01R 29/10 343/703 |
| 2015/0341096 A1* | 11/2015 | Gao | H04B 17/21 370/278 |
| 2016/0099762 A1* | 4/2016 | Wu | H04B 7/0456 370/329 |
| 2016/0112954 A1* | 4/2016 | Amizur | H04W 52/0235 370/311 |
| 2016/0183209 A1* | 6/2016 | Inoue | H04B 17/12 375/362 |
| 2016/0262174 A1* | 9/2016 | Fujishiro | H04B 7/024 |
| 2017/0280392 A1* | 9/2017 | Segev | H04W 52/0235 |
| 2018/0019899 A1* | 1/2018 | Kuchi | H04B 7/022 |
| 2018/0040964 A1* | 2/2018 | Benjebbour | H01Q 21/06 |
| 2018/0063736 A1* | 3/2018 | Sadeghi | H04W 24/10 |
| 2019/0028155 A1* | 1/2019 | Hofrichter | H04B 1/40 |
| 2019/0150114 A1* | 5/2019 | Liu | H04W 52/0229 370/252 |
| 2019/0165823 A1* | 5/2019 | Liang | H04K 3/45 |
| 2019/0173563 A1* | 6/2019 | Kakishima | H04B 7/0874 |
| 2019/0327060 A1* | 10/2019 | Liu | H04W 24/10 |
| 2019/0334596 A1* | 10/2019 | Li | H04L 1/0029 |
| 2019/0357145 A1* | 11/2019 | Lopez | H04W 52/243 |
| 2019/0387469 A1* | 12/2019 | Wilhelmsson | H04W 52/0229 |
| 2020/0021413 A1* | 1/2020 | Park | H04B 7/0469 |
| 2020/0029238 A1* | 1/2020 | Si | H04W 56/001 |
| 2020/0052753 A1* | 2/2020 | Raghavan | H04B 7/088 |
| 2020/0052758 A1* | 2/2020 | Akoum | H04B 7/0469 |
| 2020/0084718 A1* | 3/2020 | Wilhelmsson | H04L 5/0044 |
| 2020/0092814 A1* | 3/2020 | Zhou | H04L 5/0098 |
| 2020/0120604 A1* | 4/2020 | Nam | H04W 76/28 |
| 2020/0196242 A1* | 6/2020 | Höglund | H04W 72/042 |
| 2020/0229206 A1* | 7/2020 | Badic | H04W 16/32 |
| 2020/0260381 A1* | 8/2020 | Nam | H04W 52/0225 |
| 2020/0275375 A1* | 8/2020 | Liu | H04W 52/0235 |
| 2020/0314749 A1* | 10/2020 | Sarkis | H04W 72/042 |
| 2020/0351784 A1* | 11/2020 | Tsai | H04L 5/0053 |
| 2020/0358506 A1* | 11/2020 | Akoum | H04B 7/0626 |
| 2020/0413267 A1* | 12/2020 | Xue | H04W 24/02 |
| 2021/0022202 A1* | 1/2021 | Kim | H04W 76/27 |
| 2021/0068055 A1* | 3/2021 | Nam | H04L 5/10 |
| 2021/0105721 A1* | 4/2021 | Xu | H04W 52/02 |
| 2021/0119742 A1* | 4/2021 | Wu | H04W 72/046 |
| 2021/0136709 A1* | 5/2021 | Xu | H04W 56/0045 |
| 2021/0160708 A1* | 5/2021 | Chisu | H04W 76/10 |
| 2021/0204214 A1* | 7/2021 | Chang | H04W 72/0453 |
| 2021/0235381 A1* | 7/2021 | Yang | H04L 5/0094 |
| 2021/0250816 A1* | 8/2021 | Xu | H04W 36/0058 |
| 2021/0289443 A1* | 9/2021 | Nam | H04W 72/0413 |
| 2021/0297950 A1* | 9/2021 | Sundman | H04W 74/0808 |
| 2021/0306951 A1* | 9/2021 | Hwang | H04W 68/02 |
| 2021/0321334 A1* | 10/2021 | Thangarasa | H04W 52/0235 |
| 2021/0344397 A1* | 11/2021 | Lee | H04B 7/0626 |
| 2021/0352582 A1* | 11/2021 | Zeng | H04W 52/0229 |
| 2021/0367684 A1* | 11/2021 | Bendinelli | H04B 17/12 |
| 2021/0385034 A1* | 12/2021 | Hwang | G16Y 10/75 |
| 2021/0385779 A1* | 12/2021 | Oteri | H04W 8/005 |
| 2021/0392582 A1* | 12/2021 | Chen | H04W 52/0216 |
| 2022/0014250 A1* | 1/2022 | Sun | H04B 7/024 |
| 2022/0039010 A1* | 2/2022 | Takeda | H04W 72/1263 |
| 2022/0039017 A1* | 2/2022 | You | H04W 52/0235 |
| 2022/0046542 A1* | 2/2022 | Hwang | H04B 7/0613 |
| 2022/0078708 A1* | 3/2022 | Yang | H04W 76/28 |
| 2022/0078879 A1* | 3/2022 | Nimbalker | H04W 52/0216 |
| 2022/0086757 A1* | 3/2022 | Wong | H04W 52/0216 |
| 2022/0095228 A1* | 3/2022 | Sahin | H04W 52/028 |
| 2022/0124617 A1* | 4/2022 | Takeda | H04W 76/27 |
| 2022/0150836 A1* | 5/2022 | Seo | H04W 52/0216 |
| 2022/0159570 A1* | 5/2022 | Liu | H04W 52/0219 |
| 2022/0191793 A1* | 6/2022 | Murray | H04W 72/044 |
| 2022/0201608 A1* | 6/2022 | Takeda | H04W 52/0219 |
| 2022/0217628 A1* | 7/2022 | Shubhi | H04W 52/028 |
| 2022/0225151 A1* | 7/2022 | Zhang | H04W 76/28 |
| 2022/0295405 A1* | 9/2022 | Seo | H04W 52/0235 |
| 2022/0338121 A1* | 10/2022 | Fei | H04W 72/23 |
| 2022/0353814 A1* | 11/2022 | Takeda | H04W 72/1273 |

* cited by examiner

LEVERAGING WAKE-UP SIGNALS AND DISCONTINUOUS RECEPTION CYCLES FOR ASSISTED ANTENNA CALIBRATION

CROSS-REFERENCE TO RELATED APPLICATION

This Patent Application claims priority to U.S. Provisional Patent Application No. 63/042,179, filed on Jun. 22, 2020, entitled "LEVERAGING WAKE-UP SIGNALS AND DISCONTINUOUS RECEPTION CYCLES FOR ASSISTED ANTENNA CALIBRATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for leveraging wake-up signals and discontinuous reception cycles for assisted antenna calibration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include monitoring a wake-up signal (WUS) occasion based at least in part on a discontinuous reception (DRX) cycle activation duration timer; and receiving a reference signal (RS) during the WUS occasion, wherein the RS is to facilitate a UE-assisted calibration of at least one antenna element on at least one panel associated with a base station or a base station-assisted calibration of at least one antenna element on at least one panel associated with the UE.

In some aspects, a method of wireless communication, performed by a base station, may include transmitting, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE; and receiving, from the UE, a calibration measurement report that indicates at least one calibration measurement, wherein the at least one calibration measurement is based at least in part on the RS.

In some aspects, a user equipment for wireless communication may include a memory and one or more processors operatively coupled to the memory. The memory and the one or more processors may be configured to monitor a WUS occasion based at least in part on a DRX cycle activation duration timer; and receive an RS during the WUS occasion, wherein the RS is to facilitate a UE-assisted calibration of at least one antenna element on at least one panel associated with a base station or a base station-assisted calibration of at least one antenna element on at least one panel associated with the UE.

In some aspects, a base station for wireless communication may include a memory and one or more processors operatively coupled to the memory. The memory and the one or more processors may be configured to transmit, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE; and receive, from the UE, a calibration measurement report that indicates at least one calibration measurement, wherein the at least one calibration measurement is based at least in part on the RS.

In some aspects, a non-transitory computer-readable medium may store one or more instructions for wireless communication. The one or more instructions, when executed by one or more processors of a UE, may cause the one or more processors to monitor a WUS occasion based at least in part on a DRX cycle activation duration timer; and receive an RS during the WUS occasion, wherein the RS is to facilitate a UE-assisted calibration of at least one antenna element on at least one panel associated with a base station or a base station-assisted calibration of at least one antenna element on at least one panel associated with the UE.

In some aspects, a non-transitory computer-readable medium may store one or more instructions for wireless communication. The one or more instructions, when executed by one or more processors of a base station, may cause the one or more processors to transmit, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE; and receive, from the UE, a calibration measurement report that indicates at least one calibration measurement, wherein the at least one calibration measurement is based at least in part on the RS.

In some aspects, an apparatus for wireless communication may include means for monitoring a WUS occasion based at least in part on a DRX cycle activation duration timer; and means for receiving an RS during the WUS occasion, wherein the RS is to facilitate a UE-assisted calibration of at least one antenna element on at least one panel associated with a base station or a base station-assisted calibration of at least one antenna element on at least one panel associated with the UE.

In some aspects, an apparatus for wireless communication may include means for transmitting, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE; and means for receiving, from the UE, a calibration measurement report that indicates at least one calibration measurement, wherein the at least one calibration measurement is based at least in part on the RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
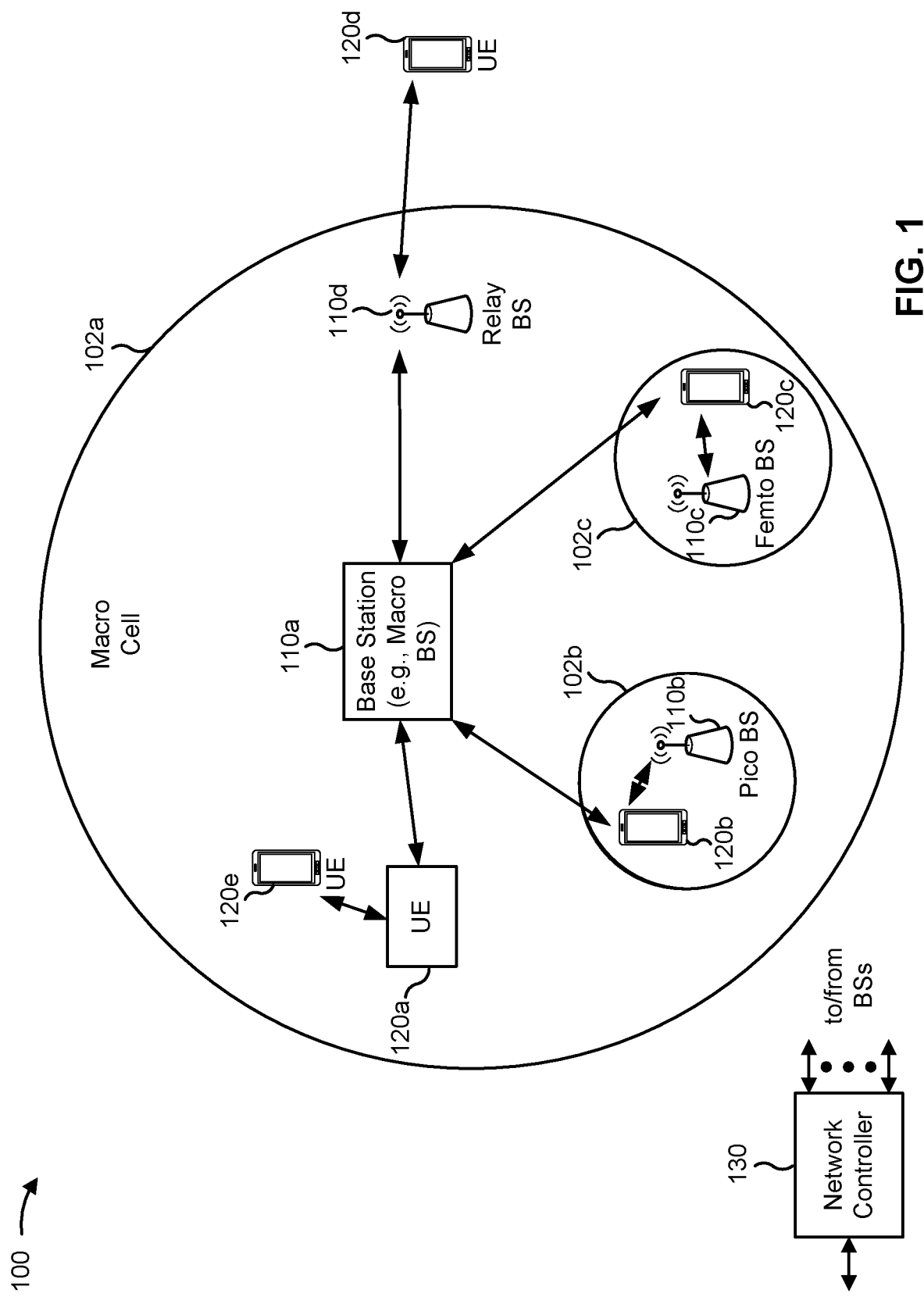
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
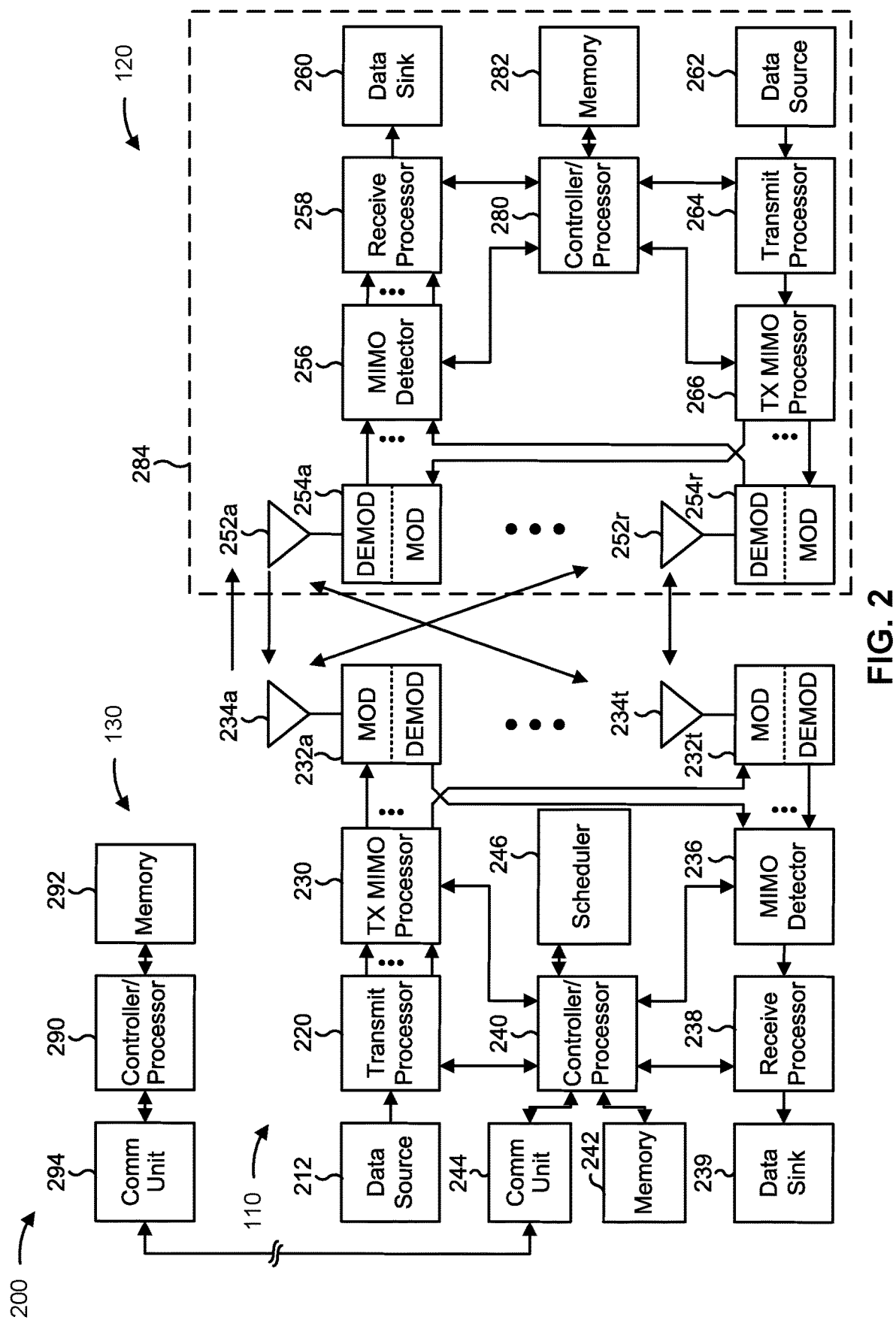
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with leveraging wake-up signals and discontinuous reception cycles for assisted antenna calibration, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for monitoring a wake-up signal (WUS) occasion based at least in part on a discontinuous reception (DRX) cycle activation duration timer, means for receiving a reference signal (RS) during the WUS occasion, wherein the RS is to facilitate a UE-assisted calibration of at least one antenna element on at least one panel associated with a base station or a base station-assisted calibration of at least one antenna element on at least one panel associated with the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE, means for receiving, from the UE, a calibration measurement report that indicates at least one calibration measurement, wherein the at least one calibration measurement is based at least in part on the RS, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
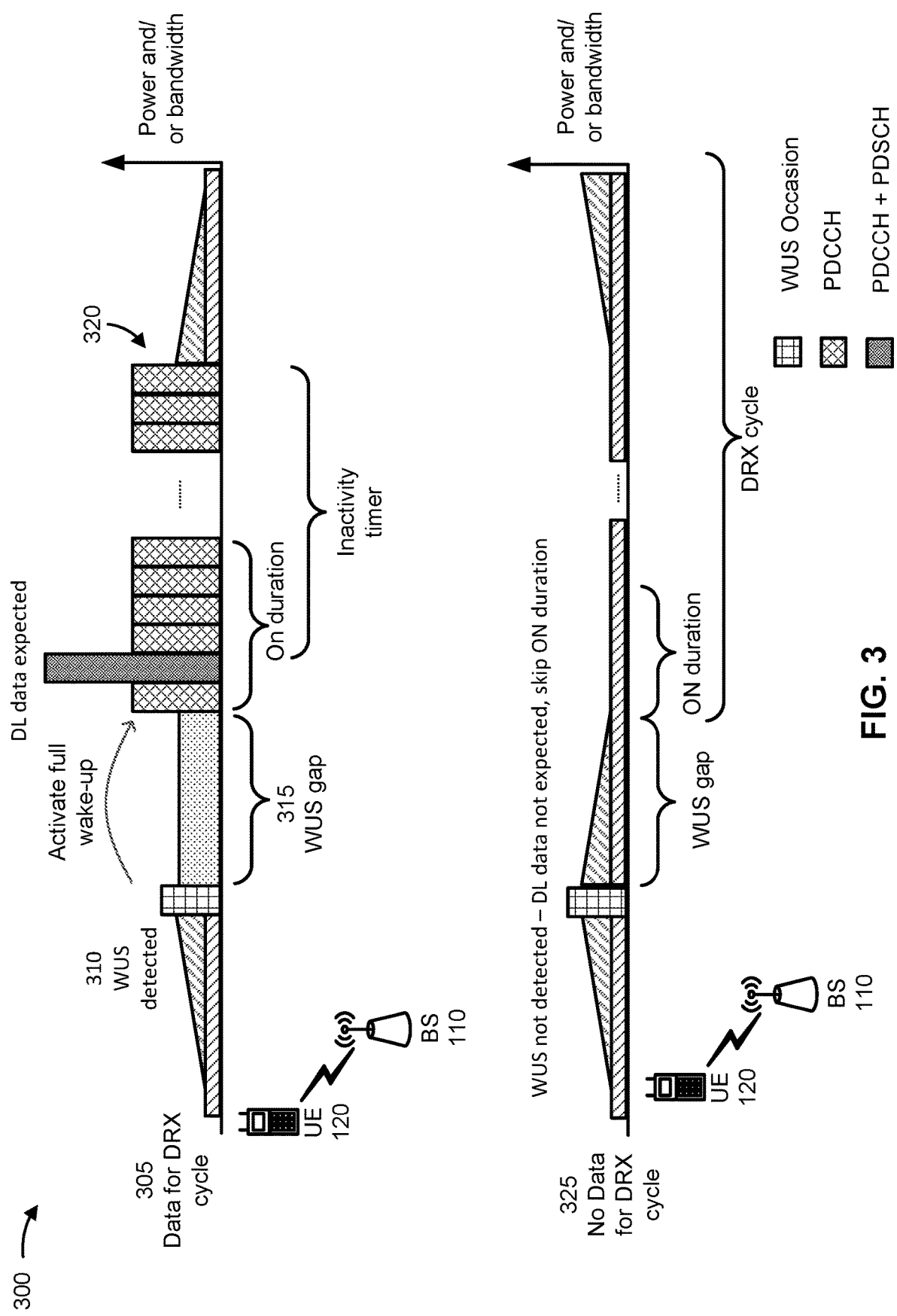
FIG. 3 is a diagram illustrating an example relating to wake-up signaling, in accordance with the present disclosure.

FIG. 3 is a diagram illustrating an example 300 relating to wake-up signaling, in accordance with the present disclosure. As shown in FIG. 3, example 300 includes a UE 120 in communication with a BS 110.

As further shown in FIG. 3, and by reference number 305, in a first scenario a downlink grant may be provided for UE 120. For example, BS 110 may determine that a downlink grant is to be provided to UE 120 during a first DRX cycle period to enable UE 120 to receive queued data from BS 110 during the DRX cycle period. As shown by reference number 310, the UE 120 may detect a wake-up signal (WUS) during a WUS occasion. In some aspects, the WUS may be transmitted by the base station 110 to wake up the UE 120 so that the UE 120 can receive a data transmission. In some aspects, the WUS may include a dedicated physical downlink control channel (PDCCH) communication transmitted by the base station 110 before a DRX (e.g., a connected mode DRX (C-DRX)) ON duration to indicate whether the UE 120 should monitor the next DRX ON duration.

In some aspects, the WUS may be associated with a two-stage wake-up procedure. In a first stage, the UE 120 may wake up to a first level for PDCCH-WUS detection. If a WUS is detected and indicates "wake-up", the UE 120 may wake up to a second level for monitoring of scheduling and reception of data. The first level and the second level may correspond to power modes. For example, in some aspects, the first level may be a low power mode and the second level may be a high power mode (a higher power mode than the low power mode). In some aspects, during the first stage, low power mode, a minimal set of hardware may be activated for PDCCH-only processing, the operating point in terms of voltage levels and clock frequencies of the hardware may be optimized, a more relaxed PDCCH processing timeline may be implemented, a receive bandwidth may be reduced, a number of candidates and/or aggregation levels for PDCCH may be reduced, and/or the like.

As shown, the UE 120 may take an amount of time to ramp up from a first level of power consumption for PDCCH-WUS detection to a second level of power consumption for monitoring for scheduling and reception of data. As shown by reference 315, a WUS gap may be configured as an amount of time between a WUS occasion and an ON duration associated with the DRX cycle. In some aspects, a WUS occasion may be only a few symbols long. In some aspects, the UE 120 may ramp up according to a warm-up time. The WUS gap may be associated with a minimum warm-up threshold corresponding to the UE 120.

In some aspects, the inactivity timer associated with a DRX sleep mode may be triggered based at least in part on not decoding any grant from PDCCH reception. As shown by reference number 320, based at least in part on expiration of an inactivity timer, UE 120 may transition to DRX sleep mode.

As shown by reference number 325, in a second scenario, a WUS may not be detected by the UE 120. For example, the base station 110 may determine that a downlink grant is not to be provided to UE 120 during a second DRX cycle period (e.g., based at least in part on the base station 110 not having data queued for transmission to UE 120), and may not provide a WUS to wake up the UE 120. As shown, the UE 120 may monitor a downlink channel to receive a WUS and may fail to receive a WUS, or may decode the WUS as "no wake-up." In this case, the UE 120 may not transition from the first bandwidth part (BWP) to the second BWP based at least in part on the WUS indicating "no wake-up" (or the lack of a WUS) and may transfer from a low-power mode to a sleep mode after completion of a WUS gap.

As indicated above, FIG. 3 is provided as an example. Other examples may differ from what is described with respect to FIG. 3.

Beamforming may be used in NR implementations to facilitate coherently combining energy and overcoming high path losses observed at higher frequencies. This may be particularly useful with millimeter wave communications. To assist with signaling, beamforming weights for receiving communications may be computed based on antennas of user equipment (UEs). The weights calculated for receiving may not be reused for transmitting since the radio frequency (RF) hardware and processing for transmitting communications is different from the RF hardware and processing for receiving communications.

Some typical approaches to establishing beamforming weights include performing a built-in self-test and calibrating each antenna and each RF chain (receive chain, transmit chain, and/or the like) separately. This approach may result in unnecessary consumption of processing resources and/or time resources. Built-in self-testing and calibration also may introduce calibration errors that can lead to loss in beamforming performance, resulting in higher latency. In some cases, larger analog/RF beamforming codebook sizes may be used, but this may result in higher latency, power consumption, thermal overheads, and/or the like. Assisted calibration techniques may be used for facilitating calibration of antenna elements without relying on costly built-in self-testing and calibration. However, assisted calibration techniques may result in consumption of useable communication resources and time resources.

According to aspects of techniques and apparatuses described herein, a wake-up signal (WUS) occasion, a WUS, and/or a discontinuous reception (DRX) cycle may be leveraged to facilitate an assisted calibration procedure. As a result, costly built-in self-testing and calibrating may be reduced or avoided, and assisted calibration may be performed without using resources that might otherwise be used for communication. As a result, aspects described herein may facilitate conservation of communication resources, reduction of latency, and/or the like. In some aspects, a UE may monitor a WUS occasion based at least in part on a DRX cycle activation duration timer. The UE may receive a reference signal (RS) during the WUS occasion and may use the RS to facilitate network assisted calibration. In some aspects, the RS may be multiplexed with the WUS. In this way, calibration error may be reduced without consuming unnecessary communication resources or time resources, leading to improved beamforming performance, which may result in reduced latency and/or higher throughput, without an increase in consumption of communication resources, time resources, and/or the like.

Figure 4:
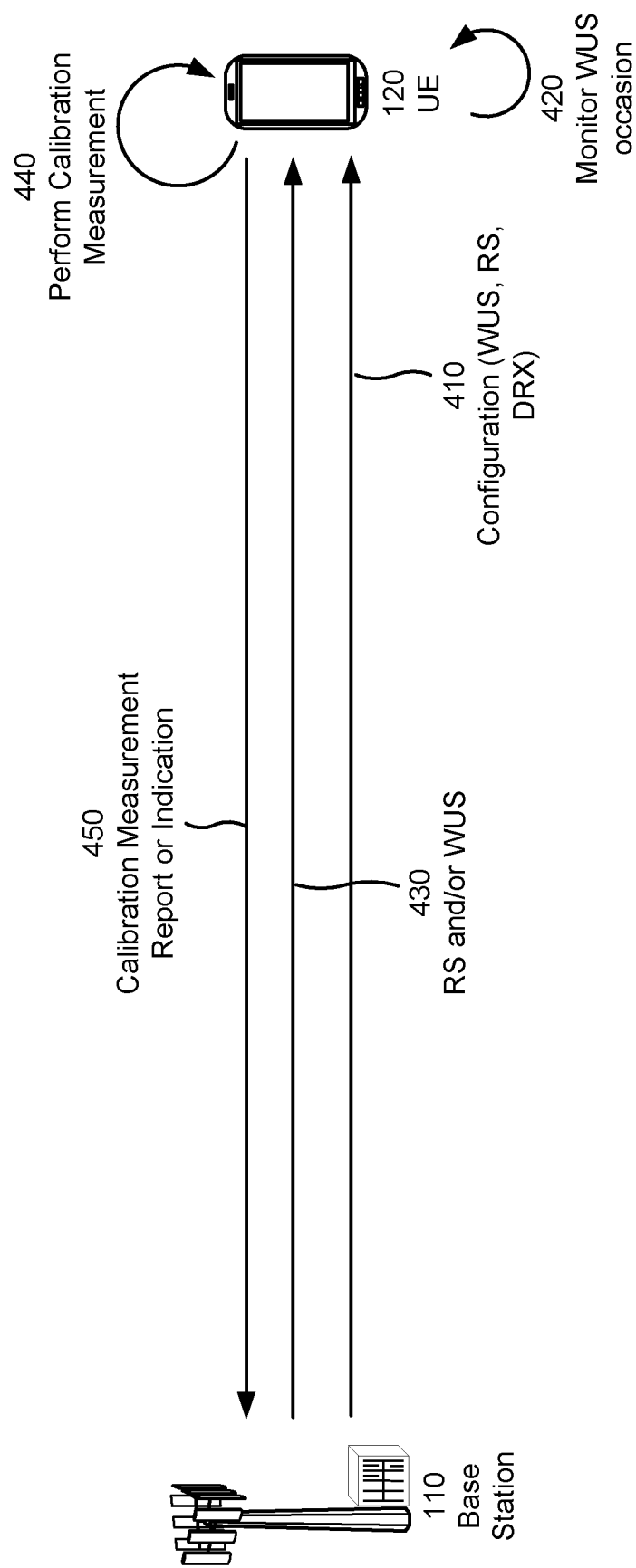
FIG. 4 is a diagram illustrating an example associated with leveraging wake-up signals and discontinuous reception cycles for assisted antenna calibration, in accordance with the present disclosure.

FIG. 4 is a diagram illustrating an example 400 associated with leveraging wake-up signals and discontinuous reception cycles for assisted antenna calibration, in accordance with the present disclosure. As shown in FIG. 4, a base station 110 and a UE 120 may communicate with one another.

As shown by reference number 410, the base station 110 may transmit, and the UE 120 may receive, a configuration associated with a network-assisted antenna calibration procedure. The configuration may include a configuration of an RS for use in obtaining measurements to facilitate network-assisted antenna calibration, a DRX cycle activation timer, a multiplexing scheme corresponding to a WUS and the RS, a DRX cycle periodicity, and/or the like. The network-assisted antenna calibration procedure may include a UE-assisted calibration of at least one antenna element on at least one panel associated with the base station 110, a base station-assisted calibration of at least one antenna element on at least one panel associated with the UE 120, and/or the like.

In some aspects, to facilitate a UE-assisted calibration of at least one antenna element on at least one panel associated with the base station 100, the base station 110 may distribute calibration overhead across multiple UEs in a cell associated with a serving cell provided by the base station 110. To distribute the calibration, the base station 110 may configure WUS/RS multiplexing and DRX cycle periodicities across the multiple UEs. In some aspects, the base station 110 may transmit, to at least one additional UE, at least one additional configuration of at least one additional RS, at least one additional DRX cycle activation timer, at least one additional multiplexing scheme corresponding to at least one additional WUS and the at least one additional RS, at least one additional DRX cycle periodicity, and/or the like.

As shown by reference number 420, the UE 120 may monitor a WUS occasion based at least in part on a DRX cycle activation duration timer. In some aspects, as shown by reference number 430, the UE 120 may receive an RS during the WUS occasion. In some aspects, the RS is to facilitate a UE-assisted calibration of at least one antenna element on at least one panel associated with the base station 110 or a base station-assisted calibration of at least one antenna element on at least one panel associated with the UE 120. In some aspects, the UE 120 may detect a WUS associated with the WUS occasion. In some aspects, the RS may be multiplexed with the WUS. In some aspects, the RS may be multiplexed with the WUS in a frequency domain.

As shown by reference number 440, the UE 120 may perform, during the WUS occasion, a calibration measurement. In some aspects, the UE 120 may perform the calibration measurement based at least in part on the RS. For example, the UE 120 may determine one or more signal characteristics associated with the RS. In some aspects, the one or more signal characteristics may be associated with an antenna element used to transmit the RS. As shown by reference number 450, the UE 120 may transmit, and the base station 110 may receive, a calibration measurement report. In some aspects, the UE 120 may transmit the calibration measurement report based at least in part on the UE 120 entering an awake state. In some aspects, the calibration measurement report may indicate at least one calibration measurement based at least in part on the RS. The at least one calibration measurement may be to facilitate the UE-assisted calibration.

In some aspects, the UE 120 may transmit, and the base station 110 may receive, an indication that one or more calibration steps for the multiple antenna elements that make the panel have been performed by the UE 120 to facilitate the base station-assisted calibration of the at least one antenna element on the at least one panel associated with the UE 120. For example, in some aspects, the one or more calibration steps may include transmitting an RS, receiving an RS, receiving feedback associated with an RS, determining one or more signal characteristics of an RS or feedback, adjusting a beamforming weight associated with the at least one antenna element, and/or the like. In some aspects, the UE 120 may transmit the indication based at least in part on the UE 120 entering an awake state. In some aspects, the UE 120 may transmit, and the base station 110 may receive, an additional RS. The additional RS may be to facilitate the base station-assisted calibration. For example, in some aspects, the base station 110 may transmit, and the UE 120 may receive, feedback based at least in part on the additional RS. The feedback may include a re-transmission of the additional RS from the base station 110 to the UE 120, an indication of one or more signal characteristics associated with the additional RS, and/or the like. The UE 120 may transmit, and the base station 110 may receive, a calibration measurement report that indicates an occurrence of one or more calibration measurements performed by the UE 120.

Aspects of the techniques described above may facilitate leveraging a WUS occasion, a WUS, and/or a DRX cycle to facilitate an assisted calibration procedure. As a result, costly built-in self-testing and calibration may be reduced or avoided and assisted calibration may be performed without using resources that might otherwise be used for communication. Thus, aspects described herein may facilitate conservation of communication resources, reduction of latency, and/or the like.

As indicated above, FIG. 4 is provided as an example. Other examples may differ from what is described with respect to FIG. 4.

Figure 5:
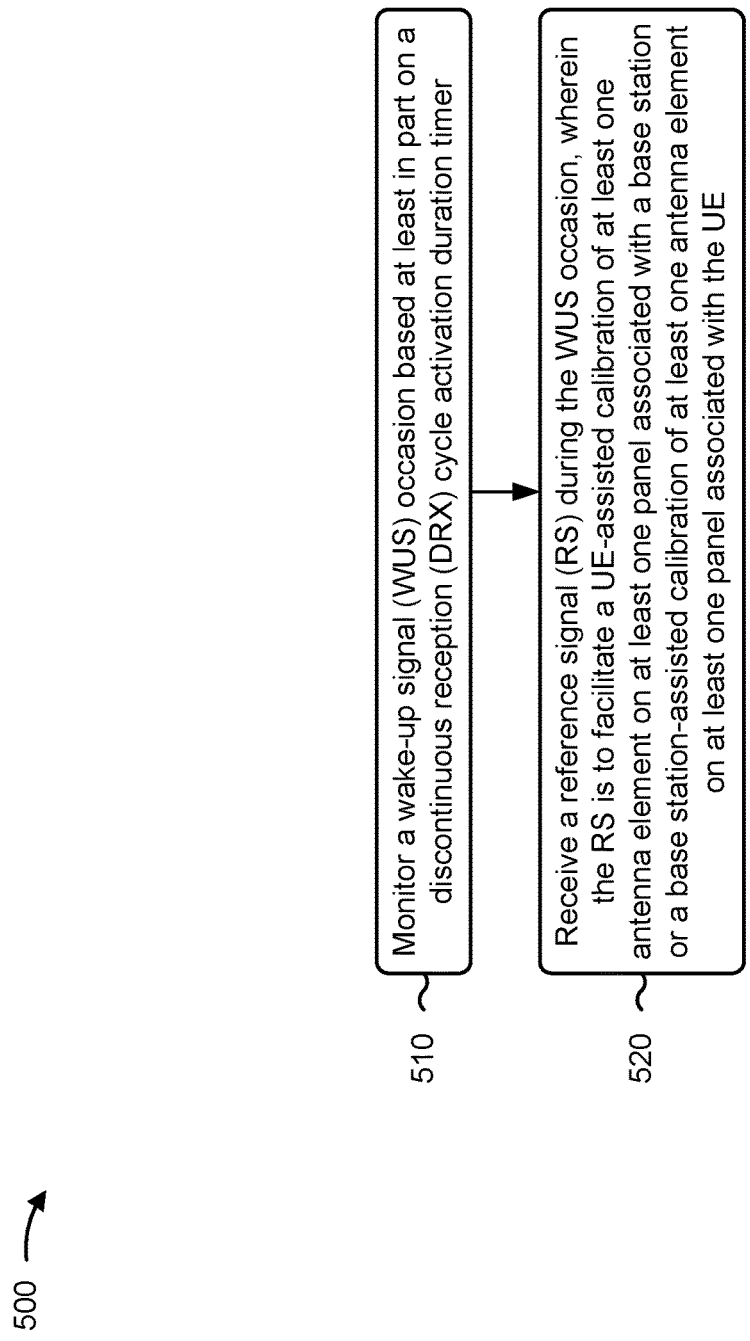
FIGS. 5 and 6 are diagrams illustrating example processes associated with leveraging wake-up signals and discontinuous reception cycles for assisted antenna calibration, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with leveraging WUSs and DRX cycles for assisted antenna calibration.

As shown in FIG. 5, in some aspects, process 500 may include monitoring a WUS occasion based at least in part on a DRX cycle activation duration timer (block 510). For example, the UE (e.g., using receive processor 258, controller/processor 280, memory 282, and/or the like) may monitor a WUS occasion based at least in part on a DRX cycle activation duration timer, as described above.

As further shown in FIG. 5, in some aspects, process 500 may include receiving an RS during the WUS occasion, wherein the RS is to facilitate a UE-assisted calibration of at least one antenna element on at least one panel associated with a base station or a base station-assisted calibration of at least one antenna element on at least one panel associated with the UE (block 520). For example, the UE (e.g., using receive processor 258, controller/processor 280, memory 282, and/or the like) may receive an RS during the WUS occasion, as described above. In some aspects, the RS is to facilitate a UE-assisted calibration of at least one antenna element on at least one panel associated with a base station or a base station-assisted calibration of at least one antenna element on at least one panel associated with the UE.

Process 500 may include additional aspects, such as any single aspect or any combination of aspects described below and/or in connection with one or more other processes described elsewhere herein.

In a first aspect, process 500 includes detecting a WUS associated with the WUS occasion, wherein the RS is being multiplexed with the WUS.

In a second aspect, alone or in combination with the first aspect, the RS is multiplexed with the WUS in a frequency domain.

In a third aspect, alone or in combination with one or more of the first and second aspects, process 500 includes performing, during the WUS occasion, a calibration measurement based at least in part on the RS.

In a fourth aspect, alone or in combination with one or more of the first through third aspects, process 500 includes transmitting, to the base station, a calibration measurement report.

In a fifth aspect, alone or in combination with the fourth aspect, transmitting the calibration measurement report comprises transmitting the calibration measurement report based at least in part on the UE entering an awake state.

In a sixth aspect, alone or in combination with one or more of the fourth through fifth aspects, the calibration measurement report indicates at least one calibration measurement based at least in part on the RS, and the at least one calibration measurement is to facilitate the UE-assisted calibration.

In a seventh aspect, alone or in combination with one or more of the first through sixth aspects, process 500 includes transmitting, to the base station, an indication that one or more calibration steps have been performed by the UE to facilitate the base station-assisted calibration of the at least one antenna element on the at least one panel associated with the UE, where transmitting the indication comprises transmitting the indication based at least in part on the UE entering an awake state.

In an eighth aspect, alone or in combination with one or more of the first through seventh aspects, process 500 includes transmitting, to the base station, at least one of an additional RS, wherein the additional RS is to facilitate the base station-assisted calibration, a calibration measurement report that indicates an occurrence of one or more calibration measurements performed by the UE, or a combination thereof.

In a ninth aspect, alone or in combination with one or more of the first through eighth aspects, process 500 receiving, from the base station, a configuration of at least one of the RS, the DRX cycle activation timer, a multiplexing scheme corresponding to a WUS and the RS, a DRX cycle periodicity, or a combination thereof.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
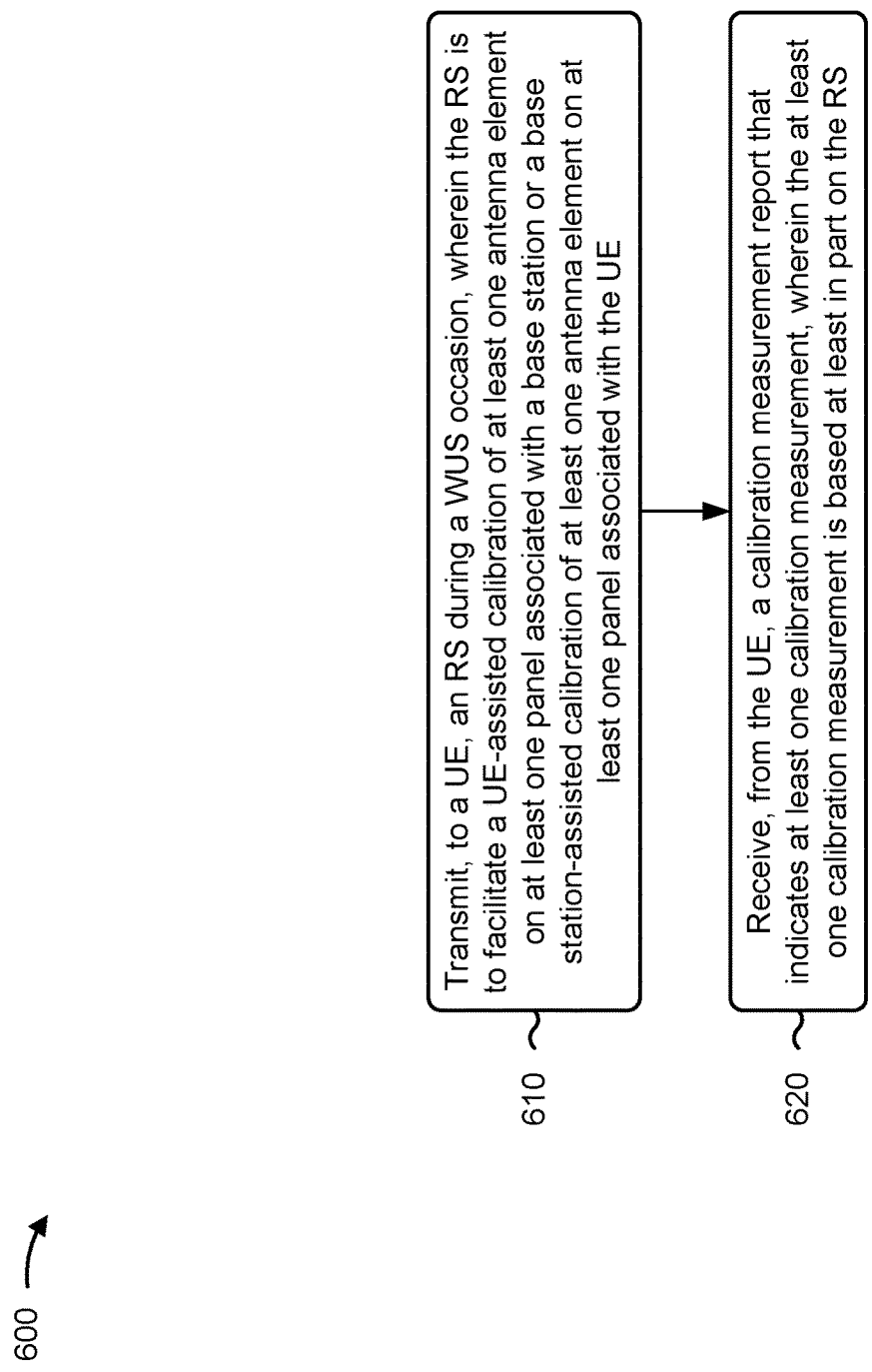

FIG. 6 is a diagram illustrating an example process 600 performed, for example, by a base station, in accordance with the present disclosure. Example process 600 is an example where the base station (e.g., base station 110 and/or the like) performs operations associated with leveraging WUSs and DRX cycles for assisted antenna calibration.

As shown in FIG. 6, in some aspects, process 600 may include transmitting, to a UE, an RS during a WUS occasion, wherein the RS is to facilitate a UE-assisted calibration of at least one antenna element on at least one panel associated with a base station or a base station-assisted calibration of at least one antenna element on at least one panel associated with the UE (block 610). For example, the base station (e.g., using transmit processor 220, controller/processor 240, memory 242, and/or the like) may transmit, to a UE, an RS during a WUS occasion, as described above. In some aspects, the RS is to facilitate a UE-assisted calibration of at least one antenna element on at least one panel associated with a base station or a base station-assisted calibration of at least one antenna element on at least one panel associated with the UE.

As further shown in FIG. 6, in some aspects, process 600 may include receiving, from the UE, a calibration measurement report that indicates at least one calibration measurement, wherein the at least one calibration measurement is based at least in part on the RS (block 620). For example, the base station (e.g., using receive processor 238, controller/processor 240, memory 242, and/or the like) may receive, from the UE, a calibration measurement report that indicates at least one calibration measurement, as described above. In some aspects, the at least one calibration measurement is based at least in part on the RS.

Process 600 may include additional aspects, such as any single aspect or any combination of aspects described below and/or in connection with one or more other processes described elsewhere herein.

In a first aspect, transmitting the RS during the WUS occasion comprises multiplexing the RS with a WUS associated with the WUS occasion.

In a second aspect, alone or in combination with the first aspect, multiplexing the RS with the WUS comprises multiplexing the RS with the WUS in a frequency domain.

In a third aspect, alone or in combination with one or more of the first and second aspects, process 600 includes receiving, from the UE, a calibration measurement report that indicates at least one calibration measurement based at least in part on the RS, wherein the at least one calibration measurement is to facilitate the UE-assisted calibration.

In a fourth aspect, alone or in combination with the third aspect, receiving the calibration measurement report comprises receiving the calibration measurement report from the UE based at least in part on the UE entering an awake state.

In a fifth aspect, alone or in combination with one or more of the first through fourth aspects, process 600 includes receiving, from the UE, an indication that one or more calibration steps have been performed by the UE to facilitate the base station-assisted calibration of the at least one antenna element on the at least one panel associated with the UE, where receiving the indication comprises receiving the indication based at least in part on the UE entering an awake state.

In a sixth aspect, alone or in combination with one or more of the first through fifth aspects, process 600 includes receiving, from the UE, at least one of an additional RS, wherein the additional RS is to facilitate the base station-assisted calibration, a calibration measurement report that indicates an occurrence of one or more calibration measurements performed by the UE, or a combination thereof.

In a seventh aspect, alone or in combination with one or more of the first through sixth aspects, process 600 includes transmitting, to the UE, a configuration of at least one of the RS, a DRX cycle activation timer, a multiplexing scheme corresponding to a WUS and the RS, a DRX cycle periodicity, or a combination thereof.

In an eighth aspect, alone or in combination with the seventh aspect, process 600 includes transmitting, to at least one additional UE, at least one additional configuration of at least one additional RS, at least one additional DRX cycle activation timer, at least one additional multiplexing scheme corresponding to at least one additional WUS and the at least one additional RS, at least one additional DRX cycle periodicity, or a combination thereof.

In a ninth aspect, alone or in combination with the eighth aspect, the UE and the at least one additional UE are associated with a serving cell provided by the base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: monitoring a wake-up signal (WUS) occasion based at least in part on a discontinuous reception (DRX) cycle activation duration timer; and receiving a reference signal (RS) during the WUS occasion, wherein the RS is to facilitate a UE-assisted calibration of at least one antenna element on at least one panel associated with a base station or a base station-assisted calibration of at least one antenna element on at least one panel associated with the UE.

Aspect 2: The method of Aspect 1, further comprising detecting a WUS associated with the WUS occasion, wherein the RS is multiplexed with the WUS.

Aspect 3: The method of Aspect 2, wherein the RS is multiplexed with the WUS in a frequency domain.

Aspect 4: The method of any of Aspects 1-3, further comprising performing, during the WUS occasion, a calibration measurement based at least in part on the RS.

Aspect 5: The method of any of Aspects 1-4, further comprising transmitting, to the base station, a calibration measurement report.

Aspect 6: The method of Aspect 5, wherein transmitting the calibration measurement report comprises transmitting the calibration measurement report based at least in part on the UE entering an awake state.

Aspect 7: The method of either of Aspects 5 or 6, wherein the calibration measurement report indicates at least one calibration measurement based at least in part on the RS, wherein the at least one calibration measurement is to facilitate the UE-assisted calibration.

Aspect 8: The method of any of Aspects 1-7, further comprising transmitting, to the base station, an indication that one or more calibration steps have been performed by the UE to facilitate the base station-assisted calibration of the at least one antenna element on the at least one panel associated with the UE, wherein transmitting the indication comprises transmitting the indication based at least in part on the UE entering an awake state.

Aspect 9: The method of any of Aspects 1-8, further comprising transmitting, to the base station, at least one of: an additional RS, wherein the additional RS is to facilitate the base station-assisted calibration, a calibration measurement report that indicates an occurrence of one or more calibration measurements performed by the UE, or a combination thereof.

Aspect 10: The method of any of Aspects 1-9, further comprising receiving, from the base station, a configuration of at least one of: the RS, the DRX cycle activation timer, a multiplexing scheme corresponding to a WUS and the RS, a DRX cycle periodicity, or a combination thereof.

Aspect 11: A method of wireless communication performed by a base station, comprising: transmitting, to a user equipment (UE), a reference signal (RS) during a wake-up signal (WUS) occasion, wherein the RS is to facilitate a UE-assisted calibration of at least one antenna element on at least one panel associated with a base station or a base station-assisted calibration of at least one antenna element on at least one panel associated with the UE; and receiving, from the UE, a calibration measurement report that indicates at least one calibration measurement, wherein the at least one calibration measurement is based at least in part on the RS.

Aspect 12: The method of Aspect 11, wherein transmitting the RS during the WUS occasion comprises multiplexing the RS with a WUS associated with the WUS occasion.

Aspect 13: The method of Aspect 12, wherein multiplexing the RS with the WUS comprises multiplexing the RS with the WUS in a frequency domain.

Aspect 14: The method of any of Aspects 11-13, further comprising receiving, from the UE, a calibration measurement report that indicates at least one calibration measurement based at least in part on the RS, wherein the at least one calibration measurement is to facilitate the UE-assisted calibration.

Aspect 15: The method of Aspect 14, wherein receiving the calibration measurement report comprises receiving the calibration measurement report from the UE based at least in part on the UE entering an awake state.

Aspect 16: The method of any of Aspects 11-15, further comprising receiving, from the UE, an indication that one or more calibration steps have been performed by the UE to facilitate the base station-assisted calibration of the at least one antenna element on the at least one panel associated with the UE, wherein receiving the indication comprises receiving the indication based at least in part on the UE entering an awake state.

Aspect 17: The method of any of Aspects 11-16, further comprising receiving, from the UE, at least one of: an additional RS, wherein the additional RS is to facilitate the base station-assisted calibration, a calibration measurement report that indicates an occurrence of one or more calibration measurements performed by the UE, or a combination thereof.

Aspect 18: The method of any of Aspects 11-17, further comprising transmitting, to the UE, a configuration of at least one of: the RS, a discontinuous reception (DRX) cycle activation timer, a multiplexing scheme corresponding to a WUS and the RS, a DRX cycle periodicity, or a combination thereof.

Aspect 19: The method of Aspect 18, further comprising transmitting, to at least one additional UE, at least one additional configuration of: at least one additional RS, at least one additional DRX cycle activation timer, at least one additional multiplexing scheme corresponding to at least one additional WUS and the at least one additional RS, at least one additional DRX cycle periodicity, or a combination thereof.

Aspect 20: The method of Aspect 19, wherein the UE and the at least one additional UE are associated with a serving cell provided by the base station.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive configuration information associated with a multiplexing scheme corresponding to a wake-up signal (WUS) and a reference signal (RS);
      monitor a WUS occasion based at least in part on a discontinuous reception (DRX) cycle activation duration timer and the configuration information;
      receive the RS during the WUS occasion, wherein the RS is to facilitate a UE-assisted calibration of at least one antenna element on at least one panel associated with a network node or a network node-assisted calibration of at least one antenna element on at least one panel associated with the UE; and
      perform, during the WUS occasion, a calibration measurement based at least in part on the RS.

2. The UE of claim 1, wherein the one or more processors are further configured to detect a WUS associated with the WUS occasion, wherein the RS is multiplexed with the WUS.

3. The UE of claim 2, wherein the RS is multiplexed with the WUS in a frequency domain.

4. The UE of claim 1, wherein the one or more processors are further configured to transmit, to the network node, a calibration measurement report based at least in part on the calibration measurement.

5. The UE of claim 4, wherein the one or more processors, to transmit the calibration measurement report, are configured to transmit the calibration measurement report based at least in part on the UE entering an awake state.

6. The UE of claim 4, wherein the calibration measurement report indicates at least one calibration measurement based at least in part on the RS, wherein the at least one calibration measurement is to facilitate the UE-assisted calibration.

7. The UE of claim 1, wherein the one or more processors are further configured to transmit, to the network node, an indication that one or more calibration steps have been performed by the UE to facilitate the network node-assisted calibration of the at least one antenna element on the at least one panel associated with the UE,
   wherein the one or more processors, to transmit the indication, are configured to transmit the indication based at least in part on the UE entering an awake state.

8. The UE of claim 1, wherein the one or more processors are further configured to transmit, to the network node, at least one of:
   an additional RS, wherein the additional RS is to facilitate the network node-assisted calibration,
   a calibration measurement report that indicates an occurrence of one or more calibration measurements performed by the UE, or
   a combination thereof.

9. The UE of claim 1, wherein the configuration information is further associated with at least one of:
   the RS,
   the DRX cycle activation timer,
   a DRX cycle periodicity, or
   a combination thereof.

10. A network node for wireless communication, comprising:
    a memory; and
    one or more processors, coupled to the memory, configured to:

transmit, to a user equipment (UE), configuration information associated with a multiplexing scheme corresponding to a wake-up signal (WUS) and a reference signal (RS);
transmit, to the UE and based at least in part on transmitting the configuration information, the RS during WUS occasion, wherein the RS is to facilitate a UE-assisted calibration of at least one antenna element on at least one panel associated with a network node or a network node-assisted calibration of at least one antenna element on at least one panel associated with the UE; and
receive, from the UE and based at least in part on the UE entering an awake state, at least one of:
a calibration measurement report that indicates at least one calibration measurement, wherein the at least one calibration measurement is based at least in part on the RS, or
an indication that one or more calibration steps have been performed by the UE to facilitate the network node-assisted calibration of the at least one antenna element on the at least one panel associated with the UE.

11. The network node of claim 10, wherein the one or more processors, to transmit the RS during the WUS occasion, are configured to multiplex the RS with a WUS associated with the WUS occasion.

12. The network node of claim 11, wherein the one or more processors, to multiplex the RS with the WUS, are configured to multiplex the RS with the WUS in a frequency domain.

13. The network node of claim 10, wherein the at least one calibration measurement is to facilitate the UE-assisted calibration.

14. The network node of claim 13, wherein the calibration measurement report is received based at least in part on the UE entering the awake state.

15. The network node of claim 10, wherein the indication is received based at least in part on the UE entering the awake state.

16. The network node of claim 10, wherein the one or more processors are further configured to receive, from the UE, at least one of:
an additional RS, wherein the additional RS is to facilitate the network node-assisted calibration,
the calibration measurement report, or
a combination thereof.

17. The network node of claim 10, wherein the configuration information is further associated with at least one of:
the RS,
a discontinuous reception (DRX) cycle activation timer,
a DRX cycle periodicity, or
a combination thereof.

18. The network node of claim 17, wherein the one or more processors are further configured to transmit, to at least one additional UE, at least one additional configuration of:
at least one additional RS,
at least one additional DRX cycle activation timer,
at least one additional multiplexing scheme corresponding to at least one additional WUS and the at least one additional RS,
at least one additional DRX cycle periodicity, or
a combination thereof.

19. The network node of claim 18, wherein the UE and the at least one additional UE are associated with a serving cell provided by the network node.

20. A method of wireless communication performed by a user equipment (UE), comprising:
receiving configuration information associated with a multiplexing scheme corresponding to a wake-up signal (WUS) and a reference signal (RS);
monitoring a WUS occasion based at least in part on a discontinuous reception (DRX) cycle activation duration timer and the configuration information;
receiving the RS during the WUS occasion, wherein the RS is to facilitate a UE-assisted calibration of at least one antenna element on at least one panel associated with a network node or a network node-assisted calibration of at least one antenna element on at least one panel associated with the UE; and
performing, during the WUS occasion, a calibration measurement based at least in part on the RS.

21. The method of claim 20, further comprising detecting a WUS associated with the WUS occasion, wherein the RS is multiplexed with the WUS.

22. The method of claim 21, wherein the RS is multiplexed with the WUS in a frequency domain.

23. The method of claim 20, further comprising transmitting, to the network node, an indication that one or more calibration steps have been performed by the UE to facilitate the network node-assisted calibration of the at least one antenna element on the at least one panel associated with the UE,
wherein transmitting the indication comprises transmitting the indication based at least in part on the UE entering an awake state.

24. The method of claim 20, further comprising transmitting, to the network node, at least one of:
an additional RS, wherein the additional RS is to facilitate the network node-assisted calibration,
a calibration measurement report that indicates an occurrence of one or more calibration measurements performed by the UE, or
a combination thereof.

25. The method of claim 20, wherein the configuration information is further associated with at least one of:
the RS,
the DRX cycle activation timer,
a DRX cycle periodicity, or
a combination thereof.

26. The method of claim 20, further comprising transmitting, to the network node, a calibration measurement report based at least in part on the calibration measurement.

27. A method of wireless communication performed by a network node, comprising:
transmitting, to a user equipment (UE), configuration information associated with a multiplexing scheme corresponding to a wake-up signal (WUS) and a reference signal (RS);
transmitting, to the UE and based at least in part on transmitting the configuration information, the RS during a WUS occasion, wherein the RS is to facilitate a UE-assisted calibration of at least one antenna element on at least one panel associated with a network node or a network node-assisted calibration of at least one antenna element on at least one panel associated with the UE; and
receiving, from the UE and based at least in part on the UE entering an awake state, at least one of:
a calibration measurement report that indicates at least one calibration measurement, wherein the at least one calibration measurement is based at least in part on the RS, or an indication that one or more calibration steps have been performed by the UE to facilitate the network node-assisted calibration of the at least one antenna element on the at least one panel associated with the UE.

28. The method of claim 27, wherein transmitting the RS during the WUS occasion comprises multiplexing the RS with a WUS associated with the WUS occasion.

29. The method of claim 27, wherein multiplexing the RS with the WUS comprises multiplexing the RS with the WUS in a frequency domain.

30. The method of claim 27, further comprising receiving, from the UE, at least one of:
   an additional RS, wherein the additional RS is to facilitate the network node-assisted calibration,
   the calibration measurement report, or
   a combination thereof.

* * * * *